April 21, 1953  R. J. SWARTZ ET AL  2,635,742
PACKAGE WHICH INCLUDES MULTIPLY FILM ENCLOSURE
WITH PLASTICIZER BETWEEN THE PLIES
Filed Sept. 21, 1951
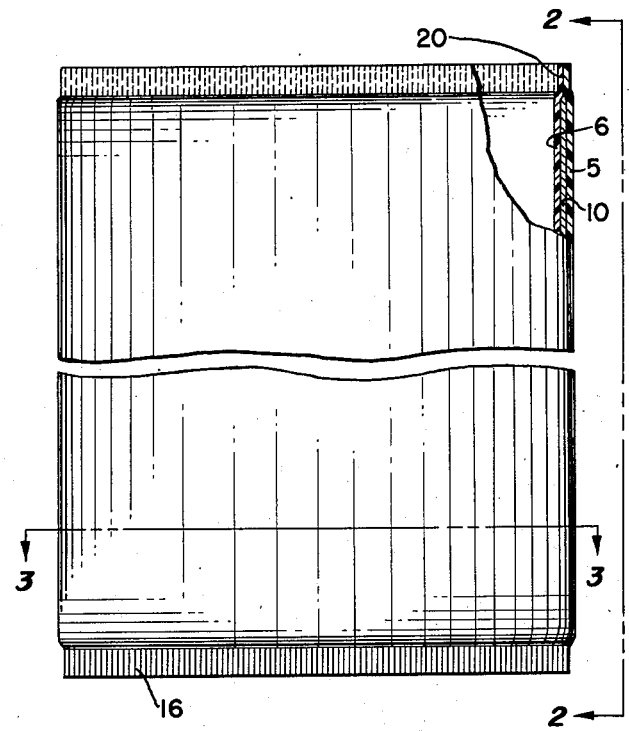
FIG. 1
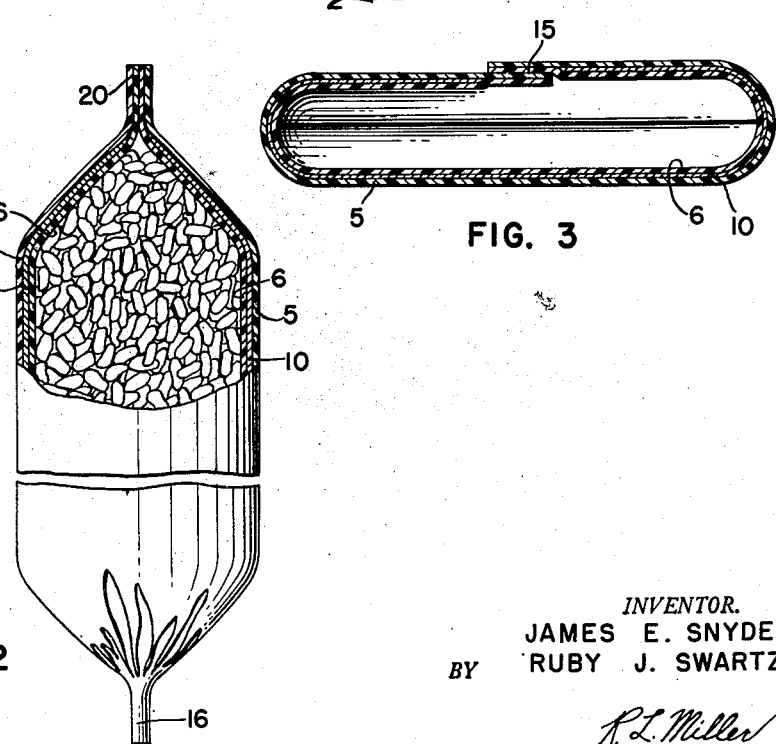
FIG. 3
FIG. 2
INVENTOR.
JAMES E. SNYDER
BY RUBY J. SWARTZ
R. L. Miller
ATTORNEY Patented Apr. 21, 1953

2,635,742

UNITED STATES PATENT OFFICE 2,635,742

PACKAGE WHICH INCLUDES MULTIPLY FILM ENCLOSURE WITH PLASTICIZER BETWEEN THE PLIES

Ruby Jean Swartz and James E. Snyder, Akron, Ohio, assignors to Wingfoot Corporation, Akron, Ohio, a corporation of Delaware Application September 21, 1951, Serial No. 247,674

7 Claims. (Cl. 206—46)

This invention relates to a package which includes a multi-ply wrapper at least one ply of which is non-fibrous organic film. Plasticizer is introduced between the plies of the wrapper and this is dissolved into the film, giving a film of high plasticizer content. The multi-ply wrapper may be in the form of a tube or a pouch, etc.

There is a limit to the amount of plasticizer that can be incorporated into packaging films by the film manufacturer. Although high plasticizer content is desired to give the film added durability and to otherwise improve its physical properties, the film can be handled with only a limited amount of plasticizer. If plasticizer is added in greater amounts it may exude to the surface, making the surface somewhat greasy, or the film may be too limp or tacky to be handled efficiently. Cut sheets or bags, etc. formed from such film stick together or "block" when stacked up ready for use, or for storage or shipment. To prevent blocking only a limited amount of plasticizer is employed by the film manufacturer and this amount is less than that which will give the maximum improvement in the film of which the plasticizer is capable.

According to this invention at least one ply of non-fibrous organic film is used in a multi-ply wrapper and extra plasticizer is located between the plies. This extra plasticizer dissolves into the film raising its plasticizer content and improving its physical properties. It takes some little time for the added plasticizer to have an effect on the film properties. The added plasticizer may give to the exposed surface of the film the characteristics which produce blocking but if the extra plasticizer is added after the package is formed, or shortly prior to forming and filling, there is no opportunity for the films to block, or any blocking which does occur is not objectionable. The added plasticizer may be placed between the plies just prior to forming the package or it may be introduced between the plies during the formation of the package or after the package has been completed.

The invention relates particularly to the use of a two-ply enclosure, both plies of which are composed of non-fibrous organic film. However, it is possible to employ one ply of metal foil or other material into which the plasticizer will not dissolve. This ply may be exposed to the contents of the package or, alternatively, it may be used to form the outer surface of the package. Alternatively, both plies may be of non-fibrous organic film but of different composition so that the plasticizer dissolves into the one more readily than into the other.

There is a great variety of organic films now on the market and any one of these may be used in carrying out the invention, for example films of polyethylene, regenerated cellulose, rubber hydrochloride, vinyl chloride-vinylidene chloride copolymer, cellulose acetate, etc.

Ordinarily the two plies are sealed together to prevent the escape of the plasticizer, although this is not essential. Thus in producing the package one square of the film is laid on the table. This is coated with plasticizer by a roller or the like. Then another sheet of plastic film of the same or different composition is placed over the coated surface of the first sheet. The sheets may be of the same size with their edges coinciding. The article is placed in the center of the top sheet and the edges of the wrapper are brought together around the article and fastened in any suitable manner.

The invention is easily adapted to pouches and the like. One of the plies of the film used in making the pouch may be coated with plasticizer by a roller or the like, and the other ply then laid over this. The edges of the two plies may then be sealed, although this is not necessary. The plies are then folded and fabricated into pouches in any desired manner. The plies are sealed to one another during the formation of the pouch, and this keeps the plasticizer in place. Alternatively, the plasticizer may be injected between the plies of the pouch after the pouch is completed or after the plies have been sealed together and before manufacturing the pouch, or alternatively, after the pouch has been filled and sealed.

The pouches may be made from tubes, or the tubes themselves may be used for packaging, as for example, packaging candy bars, etc. The ends of the tubes will be sealed to retain the extra plasticizer. This extra plasticizer may be applied to one of the films before the tube is formed, or it may be introduced between the plies during the manufacture of the tube or at any convenient time thereafter.

A preferred embodiment of the invention is illustrated in the accompanying drawing.

Fig. 1 shows a plan view of an unfilled bag;

Fig. 2 shows a filled bag, looking in the direction of line 2—2 of Fig. 1; and

Fig. 3 is a section on the line 3—3 of Fig. 1.

Although it is to be understood that the plasticizer may be injected between the plies of the film after the package is completed, the drawings illustrate a bag which contains plasticizer between the plies before filling, and the finished package. The plasticizer dissolves into the film relatively rapidly and ordinarily the two plies of film touching the plasticizer will absorb an effective amount within twenty-four hours.

In the drawings the two plies 5 and 6 are made of rubber hydrochloride of identical composition. The plasticizer content of these plies as supplied by the manufacturer is less than that required for optimum effect. Therefore, additional plasticizer 10, e. g. dibutyl sebacate, is provided by coating one side of one of the plies with it and then pressing the other ply to this. The plies are then rolled into a tube and sealed to form the seam 15. The plasticizer which coats the areas of the film which are sealed together is dissolved into the film and does not interfere with the formation of a strong bond.

Then the tube is cut into suitable lengths and with suitable heat sealing equipment the tube is sealed together to form the bottom seal 16. If the pouch is not filled at the time of fabrication, the two plies 5 and 6 are preferably sealed together around the mouth of the pouch, prior to forming the tube and bottom seal.

After filling the pouch with liquid or solid material, the opposite sides of the mouth are sealed at 20.

Example I

This example relates to a pouch with walls of three thicknesses of film. The inner ply was rubber hydrochloride film .0012 inch thick, of the following composition:

| | Parts |
|---|---|
| Rubber hydrochloride | 100 |
| Butadiene-acrylonitrile copolymer | 35 |
| Opal wax | 1 |

The intermediate ply and the outer ply were both composed of rubber hydrochloride film .0012 inch thick of the following composition:

| | Parts |
|---|---|
| Rubber hydrochloride | 100 |
| Methoxyethyl oleate | 20 |
| Dibutyl sebacate | 20 |

The film was sprayed with starch solution to provide surface slip. Eight cc. of methoxyethyl phthalate was introduced between the two inner plies of this pouch. Pouch size was 5⅛x10½ inches.

Bags constructed in this manner, each containing one quart of engine oil were tested by dropping them. The bags containing plasticizer between the plies withstood several eight-foot drops without breaking. Bags similarly constructed but having no plasticizer between the plies broke on the first drop.

The bags of Examples II through VI each measured five and one-half by six and one-half inches. Each was filled with one pound of rice. In each test ten bags with the extra plasticizer between the plies were packaged in a carton with ten made without extra plasticizer, alternating the test bags and the controls. The bags made a snug fit in the carton so that there was no opportunity for them to shift and change position. The carton was stored at —20° F. for twenty-four hours immediately preceding the test. The bags were then tumbled end over end on each face, and dropped from eighteen inches enough times to produce significant breakage.

Example II

The bag of this test was a two-ply bag, each ply being composed of polyethylene film measuring 1.0 mil. in thickness. Four cc. of mineral oil was placed between the plies. The bags plasticized with this extra mineral oil when subjected to the aforesaid test sustained only 15 per cent breakage compared with 84 per cent breakage at —20° F. suffered by similar bags in which no plasticizer was used between the plies.

Example III

In the two-ply bag of this example, each ply was formed of 120 gauge CA1 cellulose acetate film. (This 120 gauge film is 0.0012 inch thick.) Four cc. of methoxyethyl phthalate was introduced between the plies. A bag plasticized in this manner and abused as above described at —20° F. resulted in only 60 per cent breakage compared with 90 per cent breakage sustained with similar bags containing no plasticizer between the plies.

Example IV

Bags made of two plies of MSAT-80 cellophane were used in this example. The uncoated sides of the cellophane were in face-to-face contact. Four cc. of glycerol were introduced between the plies. These bags suffered only 17 per cent breakage at —20° F. compared with 100 per cent breakage undergone by similar bags containing no plasticizer.

Example V

The bags of this example were made of two plies of rubber hydrochloride film .00120 inch thick. The rubber hydrochloride film contained:

| | Parts |
|---|---|
| Rubber hydrochloride | 100 |
| Methoxyethyl oleate | 8.75 |
| Dibutyl sebacate | 8.75 |

Four cc. of methoxyethyl oleate was introduced between the plies. In the test such bags gave only 40 per cent breakage at —20° F. compared with 70 per cent breakage obtained using similar bags containing no plasticizer between the plies.

Example VI

Bags made of two plies of 100 gauge 517 Saran (vinyl chloride-vinylidene chloride copolymer) were used. (This 100 gauge film is 0.001 inch thick.) Four cc. of a mixture of 75 parts by volume of dibutyl phthalate and 25 parts by volume of cyclohexanone was introduced between the plies. The bags containing the plasticizer when cooled to —20° F. resulted in 40 per cent breakage compared with 60 per cent breakage obtained with similar bags containing no plasticizer between the plies.

The drawings and examples are merely illustrative and the invention is not limited thereto. The invention relates to the use of any liquid plasticizer. Many liquid plasticizers are known for the respective packaging materials and any of these may be used in carrying out this invention.

What we claim is:

1. A package in which the packaged material is enclosed in a multi-ply wrapper at least one ply which is non-fibrous organic film, and between the plies and adjacent the organic film plasticizer which is absorbable by the organic film.

2. Materal heat-sealed in a two-ply bag, both plies of the bag being composed of heat-sealable, non-fibrous organic film, and sealed between the plies plasticizer which is absorbable in at least one ply of the film.

3. A wrapper composed of two or more plies of non-fibrous organic film and between two of the plies and sealed therein a quantity of liquid plasticizer which is absorbable in at least one of the plies.

4. A tube composed of two or more plies of non-fibrous organic film and between two of the plies and sealed therein a quantity of liquid plasticizer which is absorbable in at least one of the plies.

5. A pouch composed of two or more plies of non-fibrous organic film and between two of the plies and sealed therein a quantity of liquid plasticizer which is absorbable in at least one of the plies.

6. Material enclosed in a two-ply container, both plies being of non-fibrous organic film and sealed between the plies plasticizer which is absorbable by at least one of the plies.

7. Material enclosed in a two-ply container both plies consisting of regenerated cellulose coated on the outer surfaces with a waterproof coating and between the plies and sealed therein a plasticizer absorbable through the uncoated surfaces of the regenerated cellulose.

RUBY JEAN SWARTZ.
JAMES E. SNYDER.

References Cited in the file of this patent

UNITED STATES PATENTS

| Number | Name | Date |
| --- | --- | --- |
| 2,113,767 | Paggi | Apr. 12, 1938 |
| 2,176,997 | Marini | Oct. 24, 1939 |
| 2,491,923 | Johnson | Dec. 20, 1949 |
| 2,554,791 | Nickerson | May 29, 1951 |
| 2,545,710 | Snyder | Mar. 20, 1951 |